(12) United States Patent
Kaler et al.

(10) Patent No.: US 7,353,535 B2
(45) Date of Patent: Apr. 1, 2008

(54) FLEXIBLE, SELECTABLE, AND FINE-GRAINED NETWORK TRUST POLICIES

(75) Inventors: Christopher G. Kaler, Sammamish, WA (US); John P. Shewchuk, Redmond, WA (US); Giovanni M. Della-Libera, Seattle, WA (US); Praerit Garg, Kirkland, WA (US); Brendan W. Dixon, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 833 days.

(21) Appl. No.: 10/404,733

(22) Filed: Mar. 31, 2003

(65) Prior Publication Data

US 2004/0193911 A1 Sep. 30, 2004

(51) Int. Cl.
*H04K 1/00* (2006.01)
*H04L 9/00* (2006.01)
(52) U.S. Cl. .............................. 726/5; 726/1; 709/225; 709/229; 709/246; 713/185
(58) Field of Classification Search .................... 726/5, 726/1; 709/225; 713/185
See application file for complete search history.

(56) References Cited

U.S. PATENT DOCUMENTS

| 6,941,471 | B2 * | 9/2005 | Lin ................................. 726/1 |
| 6,965,999 | B2 * | 11/2005 | Fox et al. ........................ 726/22 |
| 2004/0034582 | A1 * | 2/2004 | Gilliam et al. ................. 705/31 |
| 2004/0139352 | A1 * | 7/2004 | Shewchuk et al. ........... 713/201 |
| 2004/0203589 | A1 * | 10/2004 | Wang et al. ................. 455/410 |
| 2004/0220878 | A1 * | 11/2004 | Lao et al. ....................... 705/51 |
| 2005/0044398 | A1 * | 2/2005 | Ballinger et al. ............ 713/200 |
| 2006/0253700 | A1 * | 11/2006 | Della-Libera et al. ....... 713/151 |

OTHER PUBLICATIONS

"A Trust Policy Framework:"; Audun Josang; Depart of Telematics, NTNU, 7034 Trondheim, Norway Information Security Research Centre, QUT, Brisbane Qld 4001, Australia p. 192 to 202.
"Developing Electronic Trust Policies Using a Risk Managment Model"; Dean Povey: Security Unit. Cooperative Research Centre for Enterprise Distributed Systems, Level 12, B-Block, Queensland University of Technology Brisbane, Qld 4001, Australia R. Baumgart (Ed): CQRE'99, LNCS 1740, pp. 1-16, 1999.
"Applying Trust Policies for Protecting Mobile Agents Agains DoS" ; Biljana Cubaleska, University of Hagan, Communication Systems Dept., D-58084 Hagen, Germany; Markus Schneider, Fraunhofergesellschaft, Institute for Secure Telecooperation, D-64293 Darmstadt, Germany, 2002 IEEE, p. 198 to 201.

* cited by examiner

*Primary Examiner*—Nasser Moazzami
*Assistant Examiner*—Fikremariam Ylaew
(74) *Attorney, Agent, or Firm*—Workman Nydegger (57) ABSTRACT

A flexible way of expressing trust policies using, for example, XML. Multiple statement types may be expressed for a single authority type. Statement types may include less than all of the statements made by an authority type. Authority types may be defined using any manner interpretable by the computing system using the trust policy. In addition, trust policies may be updated as trust levels change. Even multiple trust policies may be used with reconciliation between the multiple trust policies being accomplished by using the more restrictive trust policy with respect to an assertion.

42 Claims, 4 Drawing Sheets

FLEXIBLE, SELECTABLE, AND FINE-GRAINED NETWORK TRUST POLICIES

BACKGROUND OF THE INVENTION

1. The Field of the Invention

The present invention relates to computer networking technology. More specifically, the present invention relates to mechanisms for applying flexible, selectable and granular policies regarding what authorities and statements are to be trusted.

2. Background and Related Art

Never before have so many had access to so much information, and never before have so many had the ability to readily communicate as they do now. This new era of highly advanced communication and information access is largely enabled by the advancement and proliferation of computer networks throughout the globe. Any individual having access to an Internet-enabled computing system may communicate with any one of millions of other similarly enabled computing systems (and potentially also their associated users). While this is certainly advantageous when behavior is appropriate, there is also the unfortunate opportunity to cause harm.

Accordingly, there is a need to ensure proper security to defend against inappropriate network communications while still permitting appropriate network communications. Authentication at least partially allows such a defense by allowing computing systems (or their associated users) to properly determine that the other computing system (or associated user) is indeed who they purport to be. A security protocol that enables such authentication includes, for example, Secure Socket Layer (SSL).

Conventionally, once a first computing system authenticates a second computing system, the first computing system still is not properly secure with respect to the second computing system. For example, the second computing system could still (in its own name) make statements that are not true, or which are true but without adequate assurances of their truth. Accordingly, the first computing system still makes the separate determination as to whether or not to trust the second computing system. In other words, the first computing system, despite believing that the second computing system is indeed the second computing system, still determines whether or not to trust the second computing system. This has conventionally been an all or nothing affair. For example, using SSL, once the second computing system has been identified, the first computing system either believes all statements that the second computing system makes appertaining to its corresponding Uniform Resource Identifier (URI) or it does not believe such statements.

Trust need not be an all or nothing affair. For example, one might trust a financial planner with respect to statements made on financial planning issues, but not with regard to statements made on child rearing. Often, making such distinctions in the human world results in better judgments. Accordingly, what would be advantageous would be mechanisms for expressing more flexible, selectable, and fine-grained control over what and who is to be trusted in the computer network so as to allow for more intelligent trusting.

BRIEF SUMMARY OF THE INVENTION

The foregoing problems with the prior state of the art are overcome by the principles of the present invention which are directed towards mechanisms for defining and changing trust policies in a flexible manner so as to allow for more fine-grained control over who and what to trust. A trust policy is information that defines what types of statements made by what type of authority are to be trusted (or distrusted). For example, a computing system (or its user) may specify that a certain news Web site is to be trusted with regards to statement on current events, but not with regards to stock prices.

In one embodiment, the trust policy may be defined as an eXtensible Markup Language (XML) document. Trust policy flexibility may be made manifest in a number of ways. For example, trust policies may be accessed by the computing system from an external or internal source. Accordingly, a trust policy may be received from an external message (such as a token) while at the same time maintaining an internal trust policy. In order to resolve any conflicts between two potentially conflicting trust policies such as these, a reconciliation method may be implemented.

There may also be flexibility in what statement types are to be trusted for a particular authority. Multiple statement types may be designated as trusted (or untrusted) for any given authority. In addition, a statement type may be expressed in any way so long as it is interpretable by the computing system. There is no need to trust (or distrust) all of the statements provided by a particular authority simply depending on whether or not a certain public key was used to encrypt an assertion. The authority type that applies to a group of one or more statement types may also be expressed in any way interpretable by the computing system. For example, an authority need not necessarily be expressed in terms of a Uniform Resource Identifier, but also using any characteristics of the authority. For example, "all people having an MBA degree from Stanford University" may be designated as a very specific authority type with corresponding trusted statement types being "any statement about financial planning" as well as "any statements about Stanford University".

This fine-grained control over the authority and statement types that may be used to flexibly define trust policies is permitted even further flexibility by allowing the trust policy to be altered to reflect changes in circumstances. A statement type corresponding to a particular authority may be deleted, replaced, or edited. In addition, authority types may be deleted, replaced or edited. Accordingly, dynamic and fine-grained control over trust policies is enabled thereby allowing for more intelligent and up-to-date trust policies.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The principles of the present invention relate to mechanisms for defining and changing trust policies in a flexible manner so as to allow for more fine-grained control over who and what to trust. Trust policy flexibility may be made manifest by allowing reconciliation between multiple trust policies, allowing for multiple statement types to correspond to a particular authority type, allowing for statement types to include less than all of the statements that are made by an authority type, allowing for flexible definitions of authorities, and permitting changes in statement types and authority types to reflect changes in trust.

The embodiments of the present invention may comprise a general-purpose or special-purpose computer system including various computer hardware components, which are discussed in greater detail below. Embodiments within the scope of the present invention also include computer-readable media for carrying or having computer-executable instructions, computer-readable instructions, or data structures stored thereon. Such computer-readable media may be any available media, which is accessible by a general-purpose or special-purpose computer system.

By way of example, and not limitation, such computer-readable media can comprise physical storage media such as RAM, ROM, EPROM, CD-ROM or other optical disk storage, magnetic disk storage or other magnetic storage devices, or any other media which can be used to carry or store desired program code means in the form of computer-executable instructions, computer-readable instructions, or data structures and which may be accessed by a general-purpose or special-purpose computer system.

In this description and in the following claims, a "network" is defined as any architecture where two or more computing systems can exchange data with each other. When information is transferred or provided over a network or another communications connection (either hardwired, wireless, or a combination of hardwired or wireless) to a computing system, the connection is properly viewed as a computer-readable medium. Thus, any such connection is properly termed a computer-readable medium. Combinations of the above should also be included within the scope of computer-readable media. Computer-executable instructions comprise, for example, instructions and data which cause a general-purpose computer system or special-purpose computer system to perform a certain function or group of functions. The computer-executable instruction may be, for example, binaries, intermediate format instructions such as assembly language, or even source code.

In this description and in the following claims, a "computing system" is defined as one or more software modules, one or more hardware modules, or combinations thereof, that work together to perform operations on electronic data. For example, the definition of computing system may include the hardware components of a personal computer, as well as software modules such as the operating system of the personal computer. A computing system may include one or more computing systems coupled via a computer network. Likewise, a computing system may include a single physical device (such as a mobile phone, Personal Digital Assistant "PDA", or Tablet PC) where internal modules (such as a memory and processor) work together to perform operations on electronic data.

Those skilled in the art will appreciate that the invention may be practiced in network computing environments with many types of computing system configurations, including routers, gateways, firewalls, proxies, personal computers, laptop computers, hand-held devices, multi-processor systems, microprocessor-based or programmable consumer electronics, network PCs, minicomputers, mainframe computers, mobile telephones, PDAs, pagers, and the like. The invention may also be practiced in distributed system environments where local and remote computing systems, which are linked (either by hardwired links, wireless links, or by a combination of hardwired and wireless links) through a network, both perform tasks. In a distributed system environment, program modules may be located in both local and remote memory storage devices.

Figure 1:
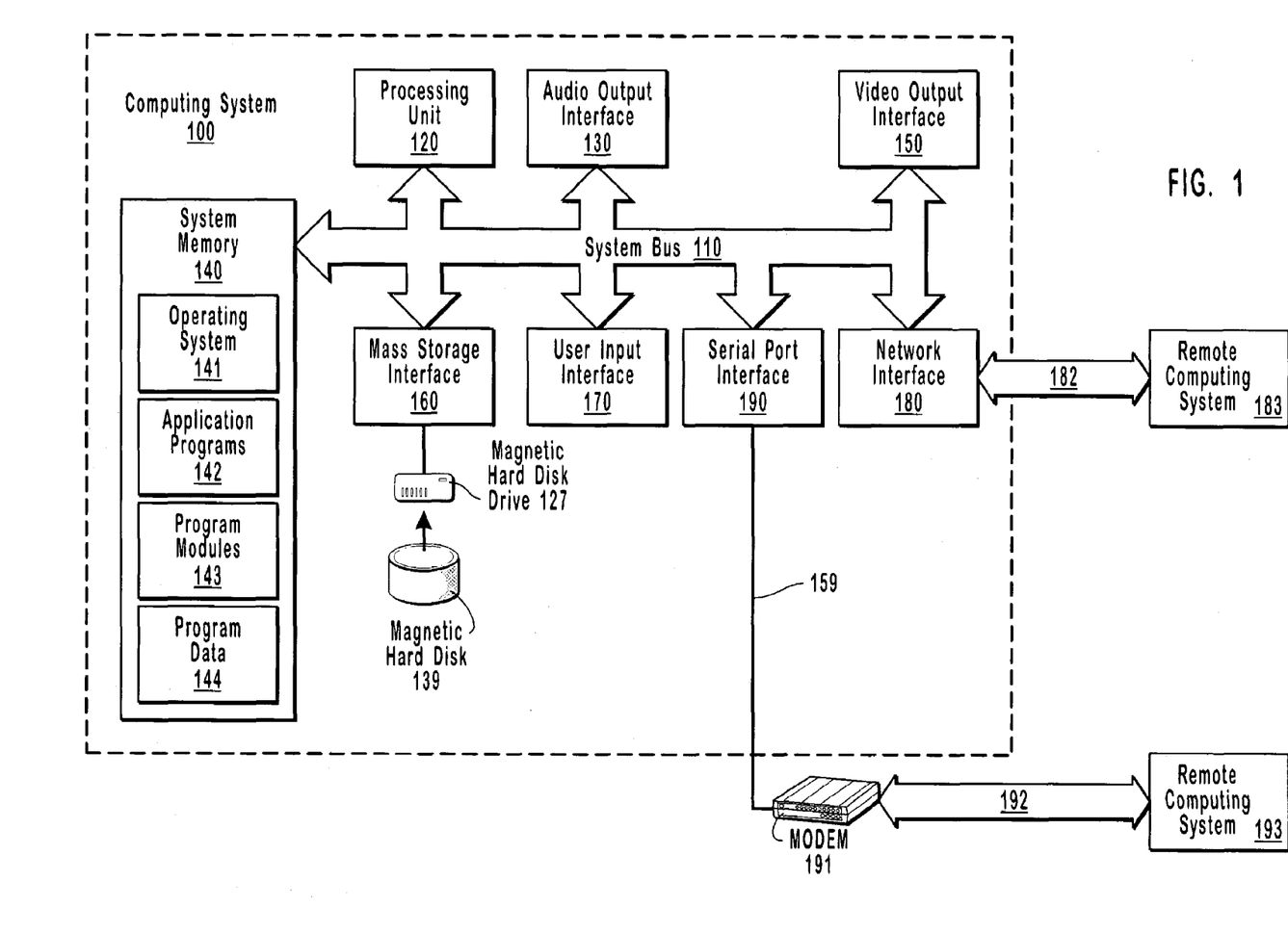
FIG. 1 illustrates a suitable computing system that may implement the principles of the present invention.

FIG. 1 and the following discussion are intended to provide a brief, general description of a suitable computing environment in which the invention may be implemented. Although not required, the invention will be described in the general context of computer-executable instructions, such as program modules, being executed by computing systems. Generally, program modules include routines, programs, objects, components, data structures, and the like, which perform particular tasks or implement particular abstract data types.

With reference to FIG. 1, a suitable operating environment for the principles of the invention includes a general-purpose computing system in the form of a computing system 100. Computing system 100 may be a personal computer that has been adapted to perform the operations disclosed herein. It should be understood that computing system 100 is merely an example of one possible computing system configuration that can be used to practice the principles of the present invention.

Computing system 100 includes a user input interface 170 that receives information from an input device, such as, for example, a keyboard, microphone, or mouse, or other appropriate input device suitable for the form factor of the computing system. An input device can be coupled to user input interface 170 so as to enable information entry. An input device can transfer information over such a coupling in response to preprogrammed data or user manipulation of the input device.

Computing system 100 can also include video output interface 150, which provides a video output signal to external video display devices. Computing system 100 may be integrally positioned with or separate from a video display device, such as, for example, a color or monochrome monitor or display. A video display device can be coupled to video output interface 150 so as to receive a provided video output signal. The video output interface may also facilitate the rendering of non-video information on the screen as is often the case with mobile devices.

Similarly, computing system 100 includes an audio output interface 130 that provides an audio output signal to audio output devices. Computing system 100 may also be integrally positioned with or separate from an audio system, which includes a speaker or other device capable of emitting sound data.

Computing system 100 includes processing unit 120, which allows for complex and flexible general-purpose processing capabilities. Processing unit 120 executes computer-executable instructions designed to implement features of computing system 100, including features of the present invention. Processing unit 120 is coupled to system bus 110, which also interconnects various other system components, including system memory 140.

System memory 140 generally represents a wide variety of volatile and/or non-volatile memories and may include types of memory previously discussed. Program code means comprising one or more program modules may be stored in system memory 140. The one or more program modules may include an operating system 141, one or more application programs 142, other program modules 143, and program data 144.

Computing system 100 also may include magnetic hard disk drive 127 for reading from and writing to magnetic hard disk 139. The magnetic hard disk drive 127 is connected to system bus 110 by mass storage interface 160. Magnetic hard disk drive 127 and magnetic hard disk 139 provide nonvolatile storage of computer-executable instructions, data structures, program modules, and other data for computing system 100. For example, magnetic hard disk 139 can store one or more program modules including operating system 141, application programs 142, other program modules 143, and program data 144.

Computing system 100 can be network connectable to networks, such as, for example, an office-wide or enterprise-wide computing network, an intranet and/or the Internet. Computing system 100 may exchange data with external systems, such as, for example, remote message processors and/or databases over such a network. Computing system 100 includes network interface 180, through which computing system 100 receives data from and transmits data to external systems. As illustrated in FIG. 1, network interface 180 facilitates the exchange of data with remote computing system 183 via logical communication link 182.

Likewise, computing system 100 includes serial port interface 190, through which computing system 100 receives data from and/or transmits data to external systems. Serial port interface 190 is coupled to modem 191 via logical communication link 159, through which computing system 100 receives data from and/or transmits data to external systems. As illustrated in FIG. 1, serial port interface 190 and modem 191 facilitate the exchange of data with remote computing system 193 via logical communication link 192.

Alternatively, computing system 100 can exchange data with external systems through other interfaces, such as, for example, a parallel port, a game port, or a universal serial bus ("USB") port. It should be understood that the described network connections are merely examples. It would be apparent to one skilled in the art, after having reviewed this description, that a wide variety of network connection techniques, in addition to those described with reference to FIG. 1, may be used to facilitate the exchange of data between computing system 100 and external systems.

While FIG. 1 represents a suitable operating environment for the present invention, the principles of the present invention may be employed in any computing system that is capable of, with suitable modification if necessary, implementing the principles of the present invention. The environment illustrated in FIG. 1 is illustrative only and by no means represents even a small portion of the wide variety of environments in which the principles of the present invention may be implemented.

Figure 2:
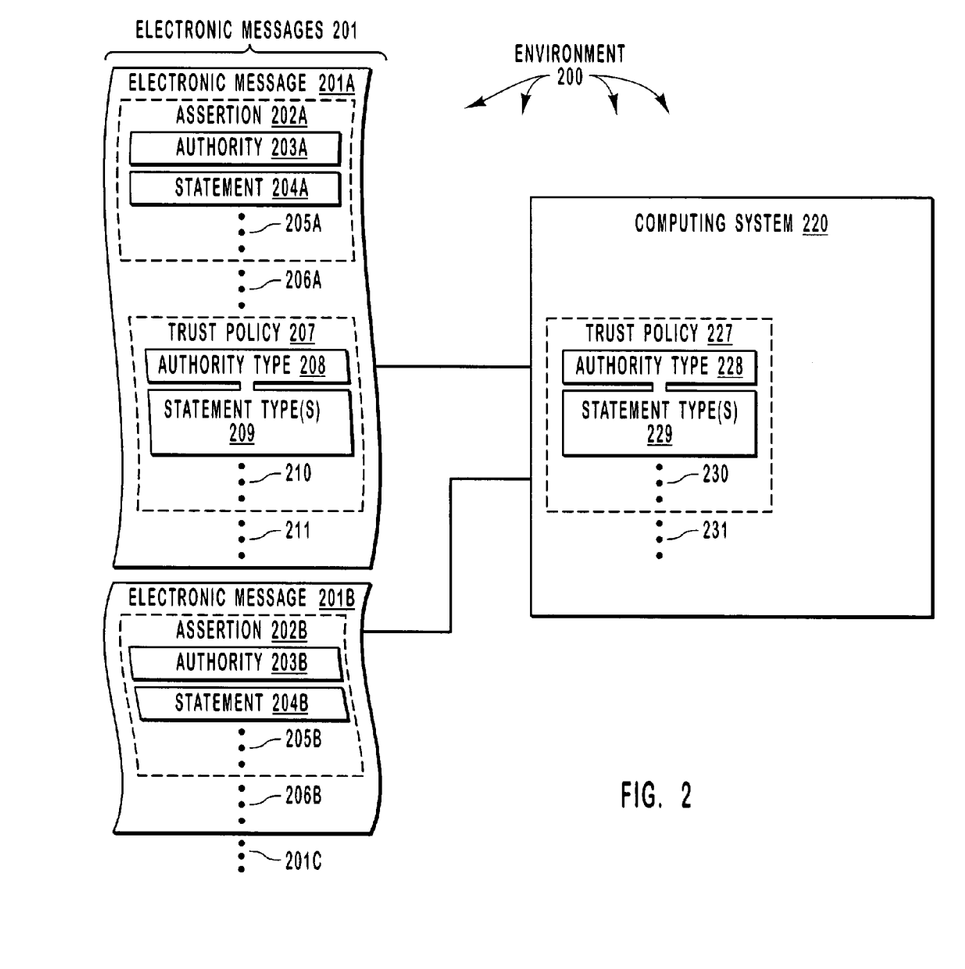
FIG. 2 illustrates the computer system having a certain trust policy and being included in an environment in which it may access electronic messages having various assertions and potential even their own included trust policies.

FIG. 2 illustrates an environment 200 in which the present invention may be employed. The environment 200 includes a computing system 220 that is capable of accessing an electronic message such as any of electronic messages 201. The computing system 220 may be structured as described above for computing system 100 although this is not required at all. The electronic messages 201 include electronic message 201A, 201B as well as potentially many others as represented by the vertical ellipses 201C.

The electronic messages 201 may be received from another computing system. In that case, if the computing system 220 were structured as described above for computing system 100, the electronic messages 201 may be received using network interface 180 or serial port interface 190. Alternatively or in addition, the electronic messages 201 may be accessed from a source internal to the computing system. In that case, if the computing system 220 were structured as described above for computing system 100, the electronic messages 201 may be part of the program data 144.

The electronic messages 201 include one or more assertions in the form of an identification of an authority as well as one or more statements made by the authority. For example, electronic message 201A includes an assertion 202A that includes an identification of an authority 203A, a statement 204A made by the authority 203A, as well as potentially other statements made by the authority 203A as represented by vertical ellipses 205A. The electronic message 201A may also include other assertions as represented by vertical ellipses 206A. The electronic message 201B may also includes an assertion 202B that includes an identification of an authority 203B, a statement 204B made by the authority 203B, as well as potentially other statements made by the authority 203B as represented by the vertical ellipses 205B. The electronic message 201B may also include other assertions as represented by vertical ellipses 206B.

Note that some of the electronic messages accessed by the computing system 220 may include a trust policy. For example, electronic message 201A has a trust policy 207 as well as potentially other trust policies as represented by vertical ellipses 211. In this description and in the claims, a "trust policy" is defined as an express designation of what statement type or types made by a particular authority type are to be trusted (or distrusted).

For example, the trust policy 207 inside the electronic message 201A includes an identification of an authority type 208 as well as an identification of one or more statement types 209 that are to be trusted (or distrusted) when made by that corresponding authority 208. Note that the statement type(s) are paired with a corresponding authority. The trust policy may also include other authority type/statement type(s) pairs as represented by the vertical ellipses 210.

The computing system 220 may also have a trust policy 227 (as well as potentially other trust policies as represented by the vertical ellipses 231) that includes an identification of an authority type 228 as well as an identification of one or more statement types 229 that are to be trusted (or distrusted) when made by that corresponding authority 228.

The trust policy may also include other authority type/statement type(s) pairs as represented by the vertical ellipses 230.

As previously mentioned, the flexible representation of trust policies allows for increased granularity and changeability in determining who and what to trust, thereby leading to potentially more intelligent and up-to-date trust decisions. One aspect of this flexibility is that multiple trust policies may be reconciled. For example, two or more internal trust policies (e.g., trust policy 227 and another represented by vertical ellipses 231) may be reconciled if they both provide conflicting trust policies with respect to an assertion. Similarly, two external trust policies (e.g., trust policy 207 and another represented by vertical ellipses 211) may be reconciled if conflicting. Also, an internal and external trust policy may be reconciled. For example, the trust policy 227 within the computing system 220 may be reconciled with the trust policy 207 within the electronic message 201A. Accordingly, trust policies may be used even if the electronic message contains a trust policy that is different than a trust policy maintained by the computing system independent of the electronic message.

Figure 3:
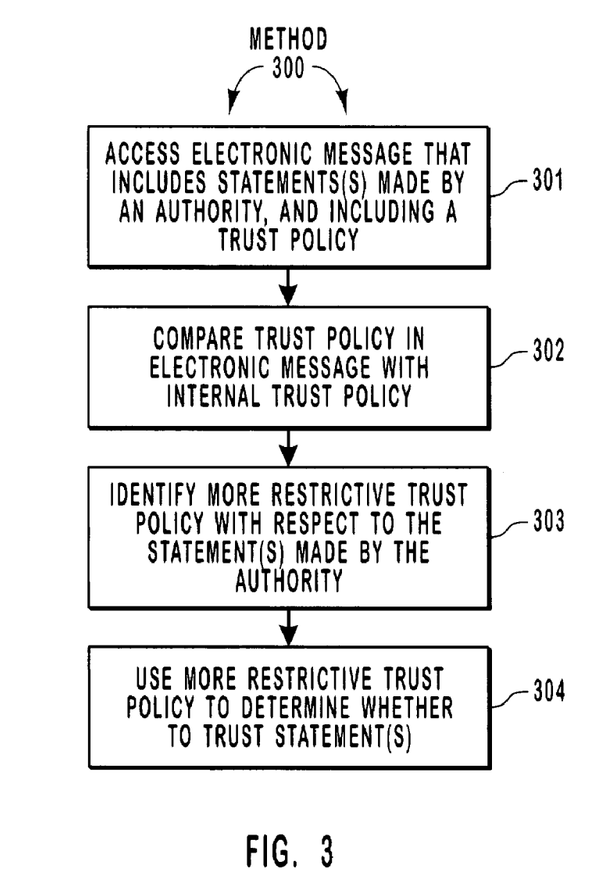
FIG. 3 illustrates a flowchart of a method for reconciling a trust policy received in an electronic message with an internal trust policy.

FIG. 3 illustrates a flowchart of a method 300 for the computing system 220 to determine whether or not to trust at least one of the statements made by the authority in the electronic message even if two trust policies need to be reconciled. The method 300 includes an act of accessing an electronic message such as, for example, the electronic message 201A (act 301). Once again, the electronic message may be accessed from a source internal to the computing system, or else received from another computing system.

The computing system 220 then performs an act of comparing the trust policy in the electronic message to the trust policy internal to the computing system (act 302). For example, trust policy 207 may be compared with trust policy 227. In accordance with one embodiment of the present invention, either or both of these trust policies may be expressed using eXtensible Markup Language documents.

The computing system 220 then performs an act of identifying which of the trust policies is more restrictive with respect to a statement made by an authority in the electronic message (act 303). For example, the electronic message may include a statement such as "Cattle futures are now valued at 100 dollars" made by an authority such as "XYZ mortgage corporation" (Any resemblance of a corporation name mentioned herein to an actual corporation name is strictly coincident and not intended). The trust policy 207 may include an authority type such as "financial institutions" with an associated trusted statement type being "financial statements". The trust policy 227 may include an authority type such as "futures markets" with an associated trusted statement type being "statements about any futures except oil futures". In this case, the trust policy 227 is more restrictive. In particular, the application of trust policy 207 would result in the statement being trusted since XYZ mortgage corporation is fictionally presumed to be a financial institution, and since the statement is a financial statement. However, the application of trust policy 227 would not result in the statement being trusted since XYZ mortgage corporation is fictionally presumed not to be a futures market. The computing system 220 would then use the identified more restrictive trust policy (or if both trust policies are equally restrictive with respect to the at least one statement would then use either the first or second trust policy) to determine whether or not to trust the at least one statement (act 304). In the example, this would result in the statement not being trusted. The method 300 may be repeated for any number of electronic messages.

Accordingly, flexibility is achieved by allowing multiple entities to offer trust policies while allowing a mechanism for reconciling the trust policies if they conflict. This is true regardless of whether the trust policies are identical, the authority types from the different trust policies overlap in scope or do not overlap, or whether the statement types overlap in scope or are different.

Figure 4:
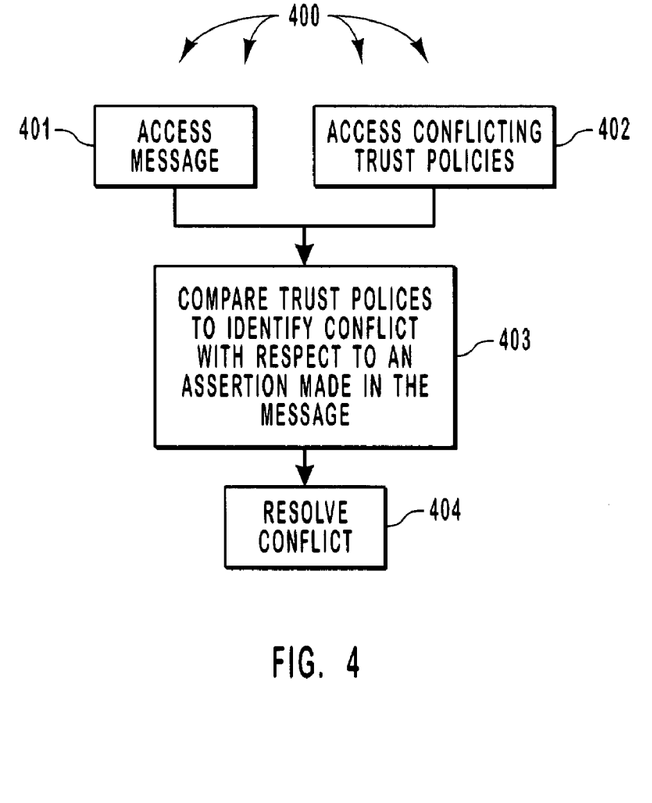
FIG. 4 illustrates a flowchart of a more general method for reconciling two trust policies.

FIG. 4 illustrates a more general method 400 of resolving two trust policies, regardless of whether the two trust policies are internal or external, or a combination thereof. Furthermore, the trust policies are resolved in any manner, not just by selecting the more restrictive trust policy. Specifically, the electronic message is accessed (act 401) in which an authority makes one or more statements. In addition, the first and second conflicting trust policies (act 402). Each trust policy includes an identification of an authority type that includes the authority that made the statement in the electronic message, as well as an identification of statement types that are to be trusted or distrusted when made by an authority of that authority type.

The first and second trust policies are then compared (act 403) to identify a conflict between the trust policies with respect to the at least one or the one or more statements made by the authority. Then, the conflict is resolved by using the first trust policy, the second trust policy, or a combination of the first and second trust policy to determine whether or not to trust the at least one of the one or more statements made by the authority. This resolution may be accomplished by choosing the most restrictive, least restrictive, the statement type with the lowest hash value, or any other resolution mechanism with respect to the statements made.

Figure 5:
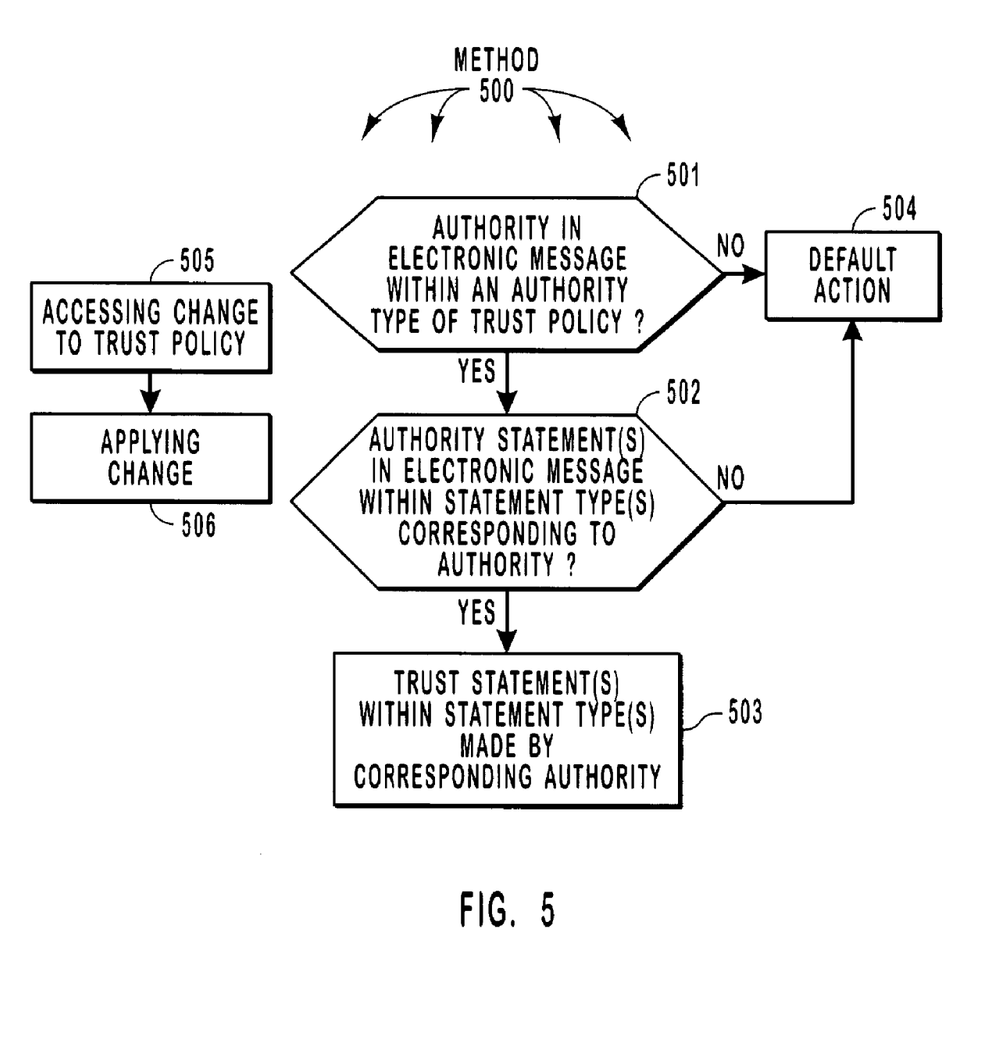
FIG. 5 illustrates a flowchart of a method for determining whether or not to trust a statement made by a particular authority.

The method 500 of FIG. 5 allows for further flexibilities in establishing a maintaining trust policies as will now be described. The method 500 may be implemented regardless of whether there are two or more trust policies that need to be reconciled as for method 300, and even if there is a single trust policy that is available. When two or more trust policies are to be reconciled, the method 500 may be seen as a specific implementation of the act of using the identified more restrictive trust policy illustrated and described above with respect to FIG. 3.

The method 500 includes an act of determining that the authority identified in the electronic message falls within the authority type specified in the applicable trust policy (decision block 501). The authority type may be expressed in a flexible manner so long as the authority type is understood by the computing system interpreting the authority type. For example, the authority type may be, "all University students" or "all University students with a GPA between 3.0 and 3.15". The authority need not be expressed in terms of its corresponding Uniform Resource Identifier. The trust policy allows for further flexibility by allowing for multiple statement types to correspond to a single authority type. For example, the statement type corresponding "all University students with a GPA between 3.0 and 3.15" may include trusted statement types such as "statements about an average college student" and "statements regarding textbooks". Furthermore, the statement types need not correspond to all statements made on behalf of a particular Uniform Resource Identifier.

If the authority in the electronic message does not correspond to a particular authority type of the trust policy (NO in decision block 501), then some default action may be taken (act 504). That default action may include not trusting any statement made by the authority, or perhaps prompting a user about whether or not they wish to trust such statements made by the authority, or perhaps whether the user wishes to classify the authority within an authority type represented in the trust policy.

If the authority in the electronic message does correspond to a particular authority type of the trust policy (YES in decision block 501), then it is determined whether or not statement(s) made by the authority in the electronic message are statement(s) of the at least one of the plurality of trusted statement type corresponding to the authority type (decision block 502). If not, (NO in decision block 502), then the default action is then taken (act 504). In this case, the default action may also include whether or not such statements made by the authority should be trusted.

The method then includes an act of trusting the at least one of the statement(s) made by the authority (act 503) if they are statement(s) of the trusted statement type(s) (YES in decision block 502). This method may be repeated for multiple electronic messages.

All during this process or between electronic messages or at any other time, the trust policy may be changed to reflect a change in trust or to more accurately reflect trust. Accordingly, the method 500 may also include an act of accessing a change (e.g., a deletion, replacement or editing) to the trust policy (act 505). The change is then applied to the trusted policy (act 506). The change may be applied to the authority type and/or the statement type corresponding to the authority type.

Accordingly, by allowing for multiple trust policies to be reconciled, by allowing flexible definitions of authority and statement types, and by allowing the trust policies to be changed, there is highly granular control over what and who is trusted, thereby allowing for more intelligent and up-to-date decision making. The trust policy does this further by not requiring that an expression of trusted statements be restricted by a single statement, without requiring that an expression of trusted statements be restricted to expressions relating to a particular Uniform Resource Identifier, while allowing a single authority type to identify multiple authorities, and by permitting change.

One way of allowing such flexibility is to represent the trust policy as an XML document. While there are limitless ways of doing this, the following represents one example of a trust policy expressed as an XML document (line number is added for clarity):

```
1.      <Trust Policy>
2.          <Scope>
3.              <BinarySecurityToken
4.                  ValueType="wsse:Base64Binary">
5.                  MIIEZzCCA9CgAwIBAgIQEmtJZc0 . . .
6.              </BinarySecurityToken>
7.          </Scope>
8.          <Policy>
9.              <StatementTypes>
10.                 Statements about financial matters
11.                 Statements about child rearing
12.             </StatementTypes>
13.         </Policy>
14.     </TrustPolicy>
```

In this example, the scope element from line 2 to line 7 represents an identification of a particular authority represented by a particular binary security token encoded using Base 64 binary encoding. However, the authority type could also easily have been "all men with 4 fingers on one hand" or other similarly descriptive authority type that does not necessarily correspond one to one with a single authority. Lines 9 to 12 represent particular statement types that will be trusted by the corresponding authority. Those of ordinary skill in the art will recognize, after having reviewed this description, that other XML document schemas may be established to represent the trust policies described herein, and that the trust policy descriptions are not limited to XML documents.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed and desired secured by United States Letters Patent is:

1. A method for use in an environment comprising a computing system capable of accessing an electronic message the electronic message including one or more assertions in the form of an identification of an authority as well as one or more statements made by the authority, the method for determining whether or not to trust at least one of the statements made by the authority in the electronic message, wherein trusting statements comprises accepting the statements as true, even if the electronic message contains a trust policy that is different than a trust policy maintained by the computing system independent of the electronic message, the method comprising the following:

an act of accessing the electronic message, the electronic message further including a first trust policy in the form of an identification of at least a first authority type that includes the identified authority and that specifies that statements of a first set of one or more statement types made by an authority of the first authority type are to be trusted;

an act of comparing the first trust policy to a second trust policy that is accessible by the computing system independent of the accessed electronic message, the second trust policy including an identification of at least a second authority type that includes the identified authority and that specifies that statements of a second set of one or more statement types made by an authority of the second authority type are to be trusted;

an act of identifying which of the first and second trust policies is more restrictive with respect to at least one statement of the one or more statements made by the authority in the electronic message; and an act of using the identified more restrictive trust policy to determine whether or not to trust the at least one statement, wherein the more restrictive trust policy is the trust policy between the first trust policy and the second trust policy that would result in more statements not being trusted.

2. A method in accordance with claim 1, wherein the set of statement types of the more restrictive trust policy comprises a single statement type.

3. A method in accordance with claim 2, wherein the more restrictive trust policy is the second trust policy, the act of using the more restrictive trust policy to determine whether or not to trust the at least one statement comprising the following:

an act of determining that the authority identified in the electronic message falls within the second authority type specified in the second trust policy that is accessible by the computing system independent of the electronic message, the second trust policy further specifying a trusted statement type in terms other than using a particular Uniform Resource Identifier;

an act of determining whether the at least one statement made by the authority in the electronic message is a statement of the trusted statement type corresponding to the authority type; and an act of trusting the at least one statements made by the authority if they are a statement of the trusted statement type.

4. A method in accordance with claim 3, wherein the authority identified in the electronic message is a first authority and wherein the at least one statement is a first statement, the method further comprising the following:

an act of accessing a second statement made by a second authority that is different than the first authority; and an act of using the second trust policy to determining that the second statement should be trusted if the second statement is of the statement type and if the second authority is of the authority type.

5. A method in accordance with claim 1, wherein the set of statement types of the more restrictive trust policy comprises a plurality of statement type.

6. A method in accordance with claim 5, wherein the more restrictive trust policy is the second trust policy, the act of using the more restrictive trust policy to determine whether or not to trust the at least one statement comprises the following:

an act of determining that the authority identified in the electronic message falls within the second authority type specified in the second trust policy that is accessible by the computing system independent of the electronic message, the second trust policy further specifying a plurality of trusted statement types corresponding to the authority type;

an act of determining whether the at least one of the one or more statements made by the authority in the electronic message is a statement of at least one of the plurality of statement types corresponding to the authority type; and an act of trusting the at least one of the one or more statements made by the authority if they are a statement of the at least one of the plurality of statement types.

7. A method in accordance with claim 6, wherein the authority identified in the electronic message is a first authority and wherein the at least one statement is a first statement, the method further comprising the following:

an act of accessing a second statement made by a second authority that is different than the first authority; and an act of using the second trust policy to determining that the second statement should be trusted if the second statement is of the statement type and if the second authority is of the authority type.

8. A method in accordance with claim 7, wherein the first and second authority types are the same.

9. A method in accordance with claim 7, wherein the first and second authority types are different.

10. A method in accordance with claim 7, wherein one or both of the first and second authority types have the same scope as the authority identified in the electronic message.

11. A method in accordance with claim 7, wherein one or both of the first an second authority types have a broader scope than the authority identified in the message so as to encompass authorities different than the identified authority.

12. A method in accordance with claim 1, further comprising the following:

an act of accessing a change to either or both of the second set of one or more statement types and the second authority type of the second trust policy; and an act of applying the change to the second trust policy.

13. A method in accordance with claim 1, wherein the act of accessing the electronic message comprises the following:

an act of receiving the electronic message from another computing system in the environment.

14. A method in accordance with claim 1, wherein the act of accessing the electronic message comprises the following:

an act of accessing the electronic message from a location within the computing system.

15. A method in accordance with claim 1, wherein neither of the first or second trust policies is more restrictive than the other with respect to the at least one statement, wherein the act of using the identified more restrictive trust policy comprises the following:

an act of using the first trust policy to determine whether or not to trust the at least one statement.

16. A method in accordance with claim 1, wherein neither of the first or second trust policies is more restrictive than the other with respect to the at least one statement, wherein the act of using the identified more restrictive trust policy comprises the following:

an act of using the second trust policy to determine whether or not to trust the at least one statement.

17. A method in accordance with claim 1, wherein the first trust policy is more restrictive than the second trust policy with respect to the at least one statement, wherein the act of using the identified more restrictive trust policy comprises the following:

an act of using the first trust policy to determine whether or not to trust the at least one statement.

18. A method in accordance with claim 1, wherein the second trust policy is more restrictive than the first trust policy with respect to the at least one statement, wherein the act of using the identified more restrictive trust policy comprises the following:

an act of using the second trust policy to determine whether or not to trust the at least one statement.

19. A computer program product for use in an environment comprising a computing system capable of accessing an electronic message, the electronic message including one or more assertions in the form of an identification of an authority as well as one or more statements made by the authority, the computer program product for implementing a method for determining whether or not to trust at least one of the statements made by the authority in the electronic message, wherein trusting statements comprises accepting the statements as true, even if the electronic message contains a trust policy that is different than a trust policy maintained by the computing system independent of the electronic message, the computer program product comprising one or more computer-readable media have thereon the following:

computer-executable instructions for causing the electronic message to be accessed, the electronic further including a first trust policy in the form of an identification of at least a first authority type that includes the identified authority and that specifies that statements of a first set of one or more statement types made by an authority of the first authority type are to be trusted;

computer-executable instructions for comparing the first trust policy to a second trust policy that is accessible by the computing system independent of the accessed electronic message, the second trust policy including an identification of at least a second authority type that includes the identified authority and that specifies that statements of a second set of one or more statement types made by an authority of the second authority type are to be trusted;

computer-executable instructions for identifying which of the first or second trust policies is more restrictive with respect to at least one statement of the one or more statements made by the authority in the electronic message; and computer-executable instructions for using the identified more restrictive trust policy to determine whether or not to trust the at least one statement wherein the more restrictive trust policy is the trust policy between the first trust policy and the second trust policy that would result in more statements not being trusted.

20. A computer program product in accordance with claim 19, wherein the one or more computer-readable media are physical media.

21. A computer program product in accordance with claim 20, wherein the physical media is non-volatile memory.

22. A computer program product in accordance with claim 20, wherein the physical media is volatile memory.

23. A method for use in an environment comprising a computing system capable of accessing an a first electronic message the first electronic message including first set of one or more assertions in the form of an identification of a first authority as well as a first set of one or more statements made by the first authority, the computing system being further capable of accessing a second electronic message that includes a second set of one or more assertions in the form of an identification of a second authority as well as a second set of one or more statements made by the second authority in the second electronic message, a method for determining whether or not to trust at least one of the statements in the first or second set of one or more statements made by the first or second authority in the first or second electronic message, wherein trusting statements comprises accepting the statements as true, without requiring that an expression of trusted statements be restricted by a single statement type, the method comprising the following:

an act of accessing the first electronic message;

an act of determining that the first authority identified in the first electronic message falls within an authority type specified in a trust policy that is accessible by the computing system independent of the first electronic message, the trust policy further specifying a plurality of trusted statement types corresponding to the authority type;

an act of determining whether the at least one of the statements in the first set of one or more statements made by the first authority in the electronic message is a statement of at least one of the first plurality of statement types corresponding to the first authority type; and an act of trusting the at least one of the statements in the first set of one or more statements made by the first authority if they are a statement of the at least one of the first plurality of statement types;

an act of accessing the second electronic message;

an act of determining that the second authority identified in the second electronic message falls within a second authority type specified in the trust policy, the trust policy further specifying a second plurality of trusted statement types corresponding to the second authority type;

an act of determining whether the at least one of the second set of one or more statements made by the second authority in the second electronic message is a statement of at least one of the second plurality of statement types corresponding to the second authority type; and an act of trusting the at least one of the second set of one or more statements made by the second authority if they are a statement of the at least one of the plurality of statement types.

24. A method in accordance with claim 23, wherein the trust policy specifies the plurality of trusted statement types using an XML document.

25. A method in accordance with claim 23, wherein at least one of the plurality of trusted statement types at least partially overlaps at least one other of the plurality of trusted statement types.

26. A method in accordance with claim 23, wherein none of the plurality of trusted statement types overlaps with any other of the plurality of trusted statement types.

27. A method in accordance with claim 23, wherein the electronic message is a first electronic message, the one or more assertions is a first set of one or more assertions, the authority is a first authority, the authority type is a first authority type, the one or more statements is a first set of one or more statements, the plurality of trusted statement types being a first plurality of trusted statement types, the computing system being further capable of accessing a second electronic message that includes a second set of one or more assertions in the form of an identification of a second authority as well as a second set of one or more statements made by the second authority in the second electronic message, the method being further for the computing system determining whether or not to trust at least one of the second set of statements made by the second authority in the second electronic message, the method further comprising the following:

an act of accessing the second electronic message;

an act of determining that the second authority identified in the second electronic message falls within a second authority type specified in the trust policy, the trust policy further specifying a second plurality of trusted statement types corresponding to the second authority type;

an act of determining whether the at least one of the second set of one or more statements made by the second authority in the second electronic message is a statement of at least one of the second plurality of statement types corresponding to the second authority type; and an act of trusting the at least one of the second set of one or more statements made by the second authority if they are a statement of the at least one of the plurality of statement types.

28. A method in accordance with claim 27, wherein the first and second authority types are different.

29. A method in accordance with claim 27, wherein the first and second authority types are the same.

30. A computer program product for use in an environment comprising a computing system capable of accessing a first electronic message the first electronic message including first set of one or more assertions in the form of an identification of a first authority as well as a first set of one or more statements made by the first authority, the computing system being further capable of accessing a second electronic message that includes a second set of one or more assertions in the form of an identification of a second authority as well as a second set of one or more statements made by the second authority in the second electronic message, a method for determining whether or not to trust at least one of the statements in the first or second set of one or more statements made by the first or second authority in the first or second electronic message, wherein trusting statements comprises accepting the statements as true, without requiring that an expression of trusted statements be restricted by a single statement type, the computer program product comprising one or more computer-readable media having there on the following:

Computer-executable instructions for causing the first electronic message to be accessed;

Computer-executable instructions for determining that the first authority identified in the first electronic message falls within an the first authority type specified in a trust policy that is accessible by the computing system independent of the first electronic message, the trust policy further specifying a first plurality of trusted statement types corresponding to the first authority type;

Computer-executable instructions for determining whether the at least one of the statements in the first set of one or more statements made by the first authority in the first electronic message is a statement of at least one of the first plurality of statement types corresponding to the first authority type; and     Computer-executable instructions for trusting the at least one of the statements in the first set of one or more statements made by the first authority if they are a statement of the at least one of the first plurality of the statement types; and     Computer-executable instructions for causing the second electronic message to be accessed:

Computer-executable instructions for determining that the second authority identified in the second electronic message falls within a second authority type specified in the trust policy, the trust policy further specifying a second plurality of trusted statement types corresponding to the second authority type:

Computer-executable instructions for determining whether the at least one of the second set of one or more statements made by the second authority in the second electronic message is a statement of at least one of the second plurality of statement types corresponding to the second authority type; and     Computer-executable instructions for trusting the at least one of the second set of one or more statements made by the second authority if they are a statement of the at least one of the plurality of statement types.

31. A computer program product in accordance with Claim 30, wherein the one or more computer-readable media are physical media.

32. A computer program product in accordance with Claim 31, wherein the physical media is non-volatile memory.

33. A computer program product in accordance with Claim 31, wherein the physical media is volatile memory.

34. A method for use in an environment comprising a computing system capable of accessing an electronic message, the electronic message including one or more assertions in the form of an identification of an authority as well as one or more statements made by the authority, a method for the computing system determining whether or not to trust at least one of the statements made by the authority in the electronic message, wherein trusting statements comprises accepting the statements as true, without requiring that an expression of trusted statements be restricted to expressions relating to a particular Uniform Resource Identifier to thereby permit more flexible expressions of what statements may be trusted for any given authority, the method comprising the following:

an act of accessing the electronic message;

an act of determining that the authority identified in the electronic message falls within an authority type specified in a trust policy that is accessible by the computing system independent of the electronic message, the trust policy further specifying a trusted statement type in terms other than using a particular Uniform Resource Identifier;

an act of determining whether the at least one of the one or more statements made by the authority in the electronic message is a statement of the trusted statement type corresponding to the authority type, further comprising an act of determining that the at least one of the one or more statements is not a statement of the trusted statement type; and     an act of trusting the one or more statements made by the authority if they are a statement of the trusted statement type, further comprising an act of not trusting the at least one of the one or more statements.

35. A method in accordance with claim 34, wherein the act of determining whether at least one of the one or more statements made by the authority in the electronic message is a statement of the trusted statement type comprises an act of determining that the least one of the one or more statements is not a statement of the trusted statement type, and wherein the act of trusting the one or more statements made by the authority if they are a statement of the trusted statement type comprises the following:

an act of not trusting the at least one of the one or more statements.

36. A method in accordance with claim 34, wherein the act of determining whether at least one of the one or more statements made by the authority in the electronic message is a statement of the trusted statement type comprises an act of determining that the least one of the one or more statements is a statement of the trusted statement type, and wherein the act of trusting the one or more statements made by the authority if they are a statement of the trusted statement type comprises the following:

an act of trusting the at least one of the one or more statements.

37. A computer program product comprising one or more computer-readable media having thereon computer-executable instructions that, when executed by a processor, perform the acts recited in claim 34.

38. A method for use in an environment comprising a computing system capable of accessing an electronic message, wherein the electronic message includes one or more assertions in the form of an identification of an authority as well as one or more statements made by the authority, the method for determining whether or not to trust at least one of the statements made by the authority in the electronic message, wherein trusting statements comprises accepting the statements as true, even if multiple conflicting trust policies apply to at least one of the one or more assertions, the method comprising the following:

an act of accessing the electronic message;

an act of accessing a first trust policy in the form of an identification of at least a first authority type that includes the identified authority and that specifies whether or not statements of a first set of one or more statement types made by an authority of the first authority type are to be trusted;

an act of accessing a second trust policy in the form of an identification of at least a second authority type that includes the identified authority and that specifies whether or not statements of a second set of one or more statement types made by an authority of the second authority type are to be trusted, wherein the first and second set of one or more statement types both apply to at least one of the one or more statements made by the authority;

an act of comparing the first trust policy to a second trust policy to identify a conflict between the first and second trust policies with respect to the at least one or the one or more statements made by the authority; and an act of resolving the conflict by using the first trust policy, the second trust policy, or a combination of the first and second trust policy to determine whether or not to trust the at least one of the one or more statements made by the authority.

39. A method in accordance with claim 38, wherein the first and second authority types are the same.

40. A method in accordance with claim 38, wherein the first and second authority types are different.

41. A method in accordance with claim 38, wherein the act of resolving the conflict by using the first trust policy, the second trust policy, or a combination of the first and second trust policy to determine whether or not to trust the at least one of the one or more statements made by the authority comprises the following:

an act of using the first trust policy entirely to determine whether or not to trust the at least one of the one or more statements made by the authority.

42. A method in accordance with claim 38, wherein the act of resolving the conflict by using the first trust policy, the second trust policy, or a combination of the first and second trust policy to determine whether or not to trust the at least one of the one or more statements made by the authority comprises the following:

an act of using the first trust policy to determine whether or not to trust at least one of the at least one of the one or more statements made by the authority; and an act of using the second trust policy to determine whether or not to trust at least one of the at least one of the one or more statements made by the authority.

* * * * *